Figure 1:
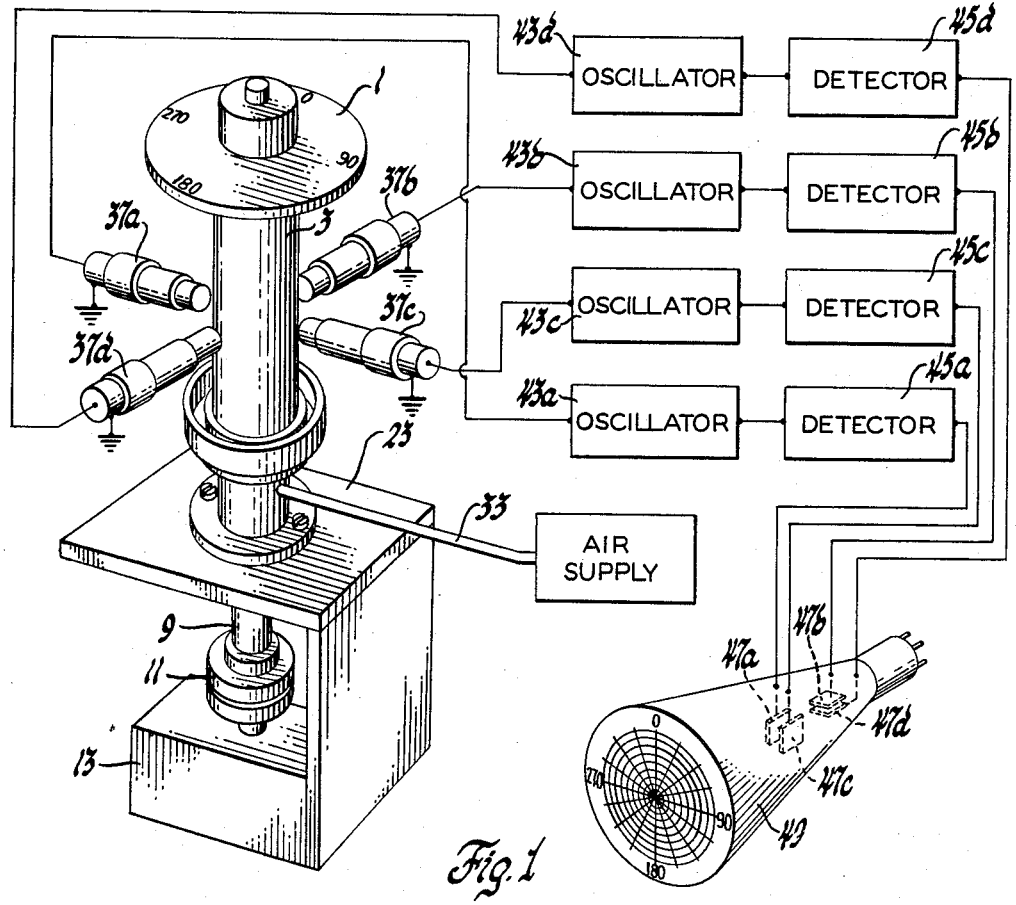

June 15, 1965  J. F. LASH  3,188,869
UNBALANCE INDICATION SYSTEM
Filed Aug. 11, 1961  2 Sheets-Sheet 1

INVENTOR.
Joseph F. Lash
BY
Robert B. Geckardt
ATTORNEY

INVENTOR.
Joseph F. Lash
BY
Robert B. Geikhardt
ATTORNEY

United States Patent Office 3,188,869
Patented June 15, 1965

3,188,869
UNBALANCE INDICATION SYSTEM
Joseph F. Lash, Ferndale, Mich., assignor to General Motors Corporation, Detroit, Mich., a corporation of Delaware
Filed Aug. 11, 1961, Ser. No. 130,801
4 Claims. (Cl. 73—483)

This invention relates to unbalance determining apparatus and more particularly to unbalance determining apparatus of the non-rotating type and having visual indication of the amount and position of unbalance.

In order to measure relatively small unbalance in a part it was formerly necessary to rotate the part at high speed in order to accentuate small static unbalances therein and therefore produce measurable vibrations. Recently non-rotating and hence non-vibratory type unbalance determining units have come into common use. By supporting the part or workpiece in a frictionless pivot, such as an air ball pivot of the type shown in Patent 2,898,764, it is possible to accurately measure relatively small unbalances in rotatable workpieces. Non-rotating type unbalance measuring arrangements usually have the workpiece supported in a horizontal plane on a vertically disposed support member that is free to tilt or incline from the vertical to a position dependent on the amount and location of the unbalance in the workpiece. By measuring the amount of tilt the magnitude of unbalance can be determined. By measuring the direction of tilt the angular location of any unbalance can be determined.

Various methods of measuring this tilt have been proposed. The simplest way is to use indicating bubbles but these have limited accuracy and require expert interpretation. Another arrangement is shown in Patent 2,898,764 and utilizes a pair of 90° spaced pickups or transducers that physically contact the tilting workpiece support. These pickups each require an exciting A.C. voltage of different phase to provide a pair of output signals that are proportional to the components of unbalance in line with the pickups. These signals can be electronically combined to provide a resultant single signal representative of the amount of unbalance and whose phase can be compared with a reference signal to indicate the angle of unbalance with respect to a reference point. This system either requires skilled operation by a worker who is operating the system or requires expensive servo amplifiers and servo motors to obtain accurate results.

It would be advantageous to have an indication system for use with a nonrotating workpiece that would be simple to construct and use. The use of proximity pickups rather than contact type pickups would also have obvious advantages in reduction of friction and increased accuracy of results. An ideal system would be one that required no adjustments and which visually and accurately indicated on a single instrument both the magnitude and the location of unbalance on a workpiece being checked.

It is therefore an object of the invention to provide an unbalance detection and measuring system wherein both the angle and amount of unbalance are simultaneously indicated on a single easily read device.

Another object of the invention is to provide an unbalance indicating system that does not require physical contact with the workpiece or its tiltably mounted support.

A further object of the invention is to provide an unbalance indication system utilizing a cathode ray tube to indicate the angle and amount of unbalance.

Still another object of the invention is to provide an unbalance indication system for use with non-rotating workpieces that will accurately and instantaneously visually show the unbalance angles.

Figure 2:
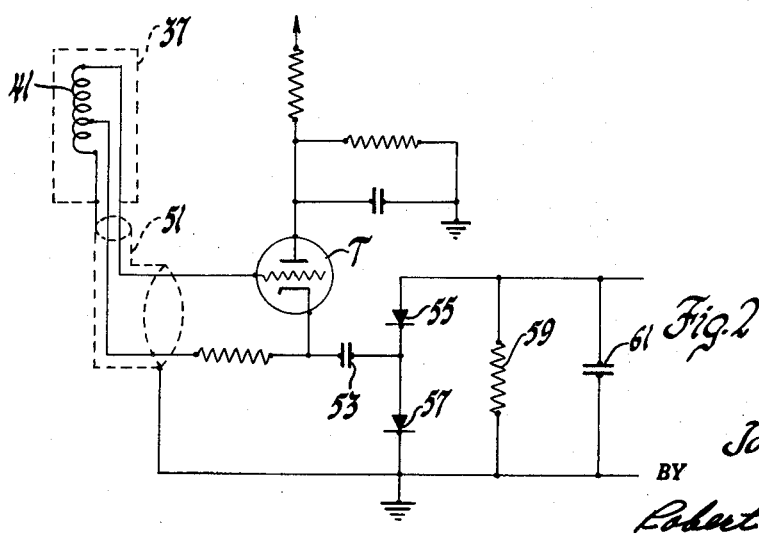
Figure 3:
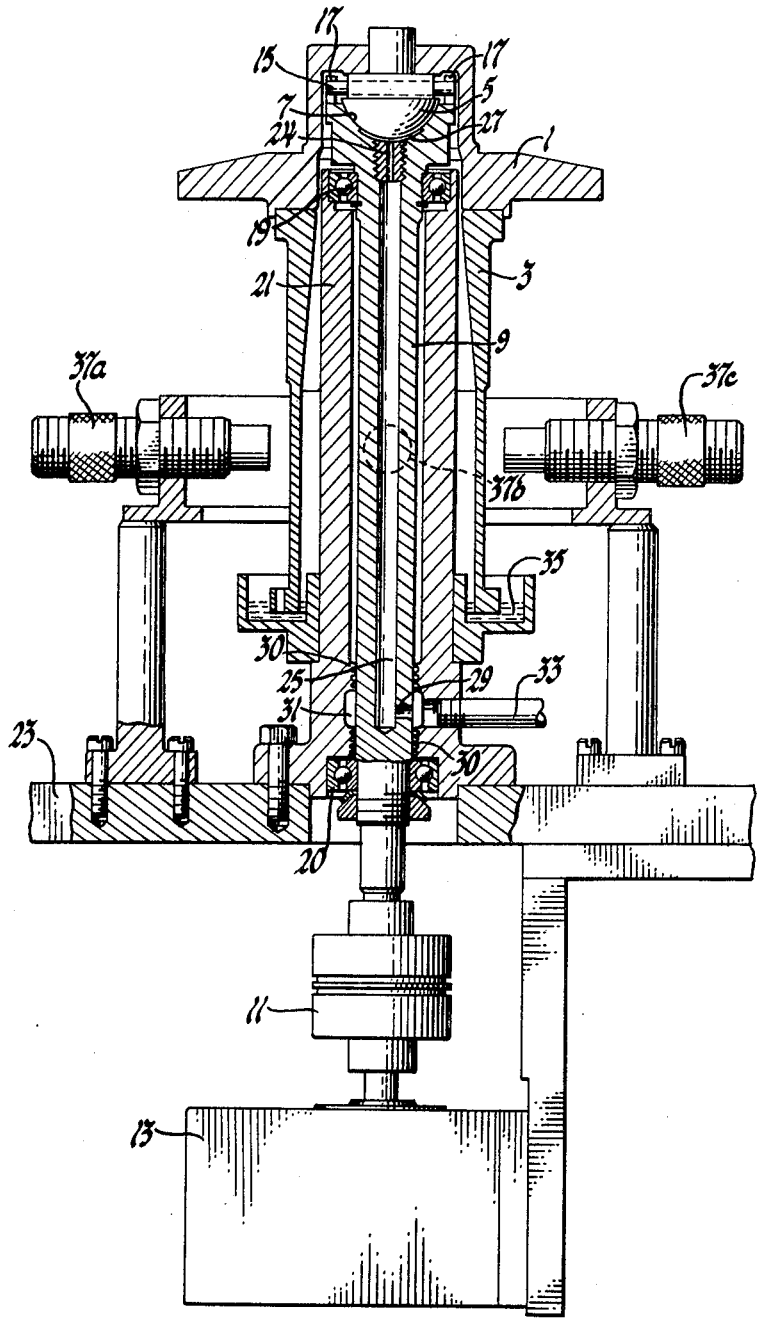

These and other objects and advantages will be readily apparent from the following description and accompanying drawings in which FIG. 1 illustrates both schematically and diagrammatically an application of the invention to a non-rotatable unbalance measuring apparatus;

FIG. 2 shows a circuit diagram of a representative pickup and oscillator unit; and FIG. 3 is a cross sectional view of the workpiece support and mounting assembly with two non-contacting proximity pickups shown.

Briefly the invention utilizes the beam deflection characteristics of a cathode ray tube to indicate the location and amount of unbalance on a calibrated face of the tube. One pair of opposed proximity type pickups are used to control the horizontal deflection of the cathode ray beam from a neutral center position and another pair of opposed proximity pickups, spaced 90° from the front pair, are used to control the vertical deflection of the cathode ray beam from its neutral center. If the face of the tube is calibrated in both angles and magnitude, the polar representation of the beam thereon will directly indicate the amount and direction of tilt of the workpiece support, and hence directly indicate the amount and position of unbalance in the workpiece.

Referring to FIGURE 1, which illustrates one application of the invention, the apparatus includes a workpiece adaptor 1 on which the workpiece, not shown, is mounted. The adaptor is connected to a tube or sleeve 3 that extends downward therefrom. FIGURE 3 shows the detailed construction of the workpiece support mechanism. The workpiece adaptor member 1 has a semi-spherical shaped ball member 5 attached thereto. The ball member 5 rests on a ball seat 7 on the end of a spindle shaft 9. The lower end of the shaft 9 is connected through a coupling 11 to a drive mechanism 13 which can be used to rotate the shaft 9 and workpiece adaptor 1 to index the workpiece to a position for correction of any unbalance therein. If the apparatus is to be used solely for determining the amount and position of unbalance, the drive mechanism 13 could be eliminated.

A dowel pin 15 received in slots 17 on the end of spindle shaft 9 provides for joint rotation of the adaptor 1 and spindle 9 and at the same time allows the adaptor and ball to vertically rise with respect to the ball seat formed in the end of the spindle 9. The spindle shaft 9 is journalled by bearings 19 in the end of a support sleeve member 21 and by bearings 20 in the lower end. The support member 21 is attached to the base 23 of the apparatus.

An axial passage 25 extends through the spindle shaft 9 and connects through a small diameter hole 24 to a spherical recessed portion 27 in the ball seat 7. A radial passage 29 connects the passage 25 to the annular chamber 31 formed by a recess in the support sleeve 21 and the body of the shaft 9. A pair of labyrinth seals 30 isolate the chamber 31. A compressed air line 33 connects into the chamber 31 and air under pressure introduced from line 33 through passages 29, 25, 24 into the recess 27 acts on the ball member 5 to lift it, the adaptor 1 and workpiece thereon. Under this condition the workpiece adaptor 1 and sleeve 3 are suspended entirely by air and hence are free to pivot about the center of the ball 5 without friction.

The lower end of sleeve or tube 3 is suspended in an annular body of silicon fluid 35 which serves to dampen and limit the rate of tilting of sleeve 3 but offers no fixed resistance to movement thereof. When an unbalanced workpiece is placed on the adaptor 1, the mass center of the combined workpiece and adaptor will move to a point directly below the geometric center causing the whole air supported assembly to tilt.

As seen in FIG. 1, there are four proximity pickups 37a, 37b, 37c, and 37d circumferentially positioned 90° apart around and spaced from the sleeve 3. The pickups are supported by suitable stationary structure not shown in FIGURE 1 but shown in the detailed FIG. 3. The pickups 37a, 37b, 37c, and 37d are of any suitable type which in effect provide a variable impedance that varies as the distance between the pickup and a metal mass. A suitable type of pickup is an Electro Products Model 4910 AN Proximity Pickup. The pickups 37 each include a tapped inductance coil 41 as shown in FIG. 2 and which provide variable eddy current losses when moved to or away from a metal object. In the present application the four pickups 37a, 37b, 37c, and 37d each form the inductive element of an oscillator circuit and will have eddy current losses that will vary as the iron sleeve 3 moves toward or away from its neutral center position and to and from the pickups.

Each of the pickups 37 is shown connected in an oscillator circuit 43a, 43b, 43c, or 43d. The oscillators each provide a fixed frequency and variable amplitude output that is demodulated by a detector or rectifier circuit 45a, 45b, 45c, or 45d. The amplitude of oscillation of the circuits will vary with the eddy current loss changes that occur with different distances of the pickups from the tube 3. As the tubes moves toward any of the pickups it increases the eddy current losses and reduces the oscillator output and when moved away from the pickup will increase the oscillator output.

The rectified or D.C. outputs of the detector circuits 45 are connected to the four electro-static deflection plates 47a, 47b, 47c, and 47d of a cathode ray tube 49. The spot beam producing gun, focus coil etc. of the cathode ray tube are not shown since they are conventional and easily understood by those skilled in the art. The face of the cathode ray tube has both angle and magnitude markings thereon. The angle markings are radial lines extending from the center of the tube face with angle markings from 0° to 360° at suitable intervals. The magnitude or amount markings are a series of concentric circles about the tube center and of increasing diameter. These circles may either be calibrated directly in unbalance units such as ounce-inches or in relative arbitrary units such as 1, 2, etc.

FIG. 2 shows a suitable form of oscillator and detector represented by the boxes 43 and 45 in FIG. 1. The oscillator shown is a Hartley type oscillator with an inductance coil 41 in parallel with the distributed capacity of the windings and the capacitance of the leads of a shielded connecting cable 51. By using a predetermined length of cable 51 the C value of the LC tank of the Hartley oscillator can be fixed. The L value of the LC tank is determined by the inductance of the coils 41. The oscillator 43 also includes a triode amplifier tube T connected as a cathode follower output amplifier through a coupling capacitor 53 to a voltage doubler circuit including diodes 55 and 57. A resistance 59 and capacitor 61 provide filtration and ripple reduction of the doubler output because the capacitance of the capacitor 61 is large and the load slight, i.e., only a small amount of current is drawn by the load. Also, the resistance of the resistor 59 is high but such that a leakage path is afforded through which the capacitor 61 can discharge so as to reflect reductions in the amplitude of the doubler output. If necessary, amplifiers may be inserted between the oscillators 43 and detectors 45 to increases the D.C. voltage output of the detectors 45a, 45b, 45c, and 45d fed to the deflection plates 47a, 47b, 47c, and 47d.

If a balanced part or workpiece is placed on the adaptor 1, then the adaptor 1 and tube 3 will remain centered without tilt and the tube will be equidistant from all four of the pickups 37. In this case the pickups control the oscillator to produce signals of equal amplitudes and the D.C. potentials in all the deflection plates will then also be equal and the electron beam spot on the cathode ray tube face will be centered. If the part to be checked has an unbalance at the zero degree position of the adaptor in FIG. 1, the lower end of the tube 3 will move toward pickup 37d and away from pickup 37b. This movement will cause the output from the detector 37d to decrease and the output from detector 37b to increase and cause the spot on the tube face to move upward or along the 0° angle radial line. The amount that the spot moves from the center can be measured by the amount circles and will indicate the magnitude of unbalance.

Similarly if an unbalance in the workpiece is at the 90° point on the adaptor the spot will move to the right along the 90° line on the tube face. An unbalance at some point other than at the 90°, 180°, 270°, or 0° position will cause changes in the outputs of all four oscillators 43a, 43b, 43c, and 43d, resulting in a vector addition of the electrostatic forces on the cathode ray tube beam.

The apparatus can be employed in a manually operated system wherein the workpiece is marked at the point of unbalance as indicated on the cathode ray tube face and marked with the amount of unbalance. An automatic marking system could also be employed or an unbalance correction system that corrects for the unbalance while the workpiece is on the unbalance measuring apparatus could also be used.

It will be seen from the above that I have provided a simple and accurate method and apparatus for visually indicating both the amount and position of unbalance in a part or workpiece, which method and apparatus does not require rotation of the workpiece and which does not require expert operation.

Changes and modifications, as well as other applications of the invention will be apparent to those skilled in the art and such modifications and applications are deemed to be within the scope of the invention which is limited only by the following claims.

I claim:

1. An unbalance indication system for visually indicating the amount and position of the static unbalance in a workpiece having an axis of rotation, the combination including vertically disposed support means for supporting the workpiece with its axis in a vertical position, means pivotally suspending said support means for inclination from its vertical position, four relatively fixed proximity pickup members circumferentially spaced 90° apart around and adjacent to said support and located substantially in a horizontal plane, said pickup members being equally spaced from said support means when in its vertical position, a cathode ray tube including electron beam means and vertical and horizontal deflection means for deflecting the direction of said electron beam, circuit means connecting one opposed pair of said pickup members to said vertical deflection means for control of the same in accordance with changes in the spacing between said one pair of pickup members and said support means, and cricuit means connecting the other opposed pair of pickup members to said horizontal deflection means for control thereof in accordance with changes in the spacing between said other pair of pickup members and said support means, inclination of said support means relative to its vertical position by the workpiece while non-rotating and resulting movement of the same relative to said pickup members causing said beam to deflect vertically and horizontally from a normal centered position to a position indicative of the magnitude and direction of inclination of the support means and accordingly the amount and the position of the static unbalance in the workpiece.

2. An unbalance indication system for visually indicating the amount and position of the static unbalance in a workpiece having an axis of rotation, the combination including vertically disposed support means for supporting the workpiece, means pivotally suspending said support means for inclination from its vertical position, four relatively fixed proximity pickup members circumferentially spaced 90° apart around and adjacent to said support means and located substantially in a horizontal plane, said pickup members being equally spaced from said support means when in its vertical position, a cathode ray tube including electron beam means and vertical and horizontal deflection means for deflecting the direction of said electron beam, first circuit means connecting one opposed pair of said pickup members to said vertical deflection means for control of the same in accordance with changes in the spacing between said one pair of pickup members and said support means, and second circuit means connecting the other opposed pair of pickup members to said horizontal deflection means for control thereor, in accordance with changes in the spacing between said other pair of pickup members and said support means, inclination of said support means relative to said pickup members by the workpiece while non-rotating causing said beam to deflect vertically and horizontally from a normal centered position to a position indicative of the amount and direction of inclination of the support means and accordingly the amount and the position of the static unbalance in the workpiece, each of said circuit means including a pair of oscillators having A.C. signal outputs whose amplitudes are dependent on the spacing of said pickup members with respect to said support means, and rectifier means for providing a D.C. signal whose magnitude is related to said spacing, said D.C. signals effective to control said deflection plates.

3. An unbalance indication system for visually indicating the amount and position of the static unbalance in a workpiece having an axis of rotation, the combination including vertically disposed support means for supporting the workpiece, means including an air pressure ball pivot for pivotally suspending said support means for frictionless inclination from its vertical position, four relatively fixed proximity pickup members circumferentially spaced 90° apart around and adjacent to said support means and located substantially in a horizontal plane, said pickup members being equally spaced from said support means when in its vertical position, a cathode ray tube including electron beam means and vertical and horizontal deflection means for deflecting the direction of said electron beam, circuit means connecting one opposed pair of said pickup members to said vertical deflection means for control of the same in accordance with changes in the spacing between said one pair of pickup members and said support means, and circuit means connecting the other opposed pair of pickup members to said horizontal deflection means for control thereof in accordance with the changes in the spacing between said other pair of pickup members and said support means, inclination of said support means relative to said pickup members by the workpiece while non-rotating causing said beam to deflect vertically and horizontally from a normal centered position to a position indicative of the amount and direction of tilt of the support means and accordingly the amount and the position of the static unbalance in the workpiece.

4. An unbalance indication system for visually indicating the amount and position of the static unbalance in a workpiece having an axis of rotation, the combination including vertically disposed metal support means for supporting the workpiece with its axis in a vertical position, means pivotally suspending said support means for inclination from its vertical position, four relatively fixed proximity pickup members circumferentially spaced 90° apart around and adjacent to said support means and located substantially in a horizontal plane, said pickup members being equally spaced from said support means when in its vertical position, a cathode ray tube including electron beam means, a pair of electrostatic vertical deflection plates and a pair of electrostatic horizontal deflection plates for deflecting the direction of said electron beam, said pickup members each including an inductance coil, a plurality of A.C. oscillator circuits, each including one of said pickup coils as a component thereof, said coils and said metal support means cooperating to vary eddy current losses in said oscillator circuits in accordance with the distance between said coils and said metal support means and thereby vary the amplitude of the A.C. outputs of said oscillators, a plurality of rectifier means each connected to the outputs of one of said oscillators for converting the variable amplitude A.C. output to a variable D.C. output, and circuit means connecting the D.C. output of the rectifiers to the vertical and deflection plates to cause the same to deflect the electron beam in accordance with changes in the spacing between said pickup members and said support means, whereby inclination of said support means relative to said pickup members by the workpiece while non-rotating causes said beam to deflect vertically and horizontally from a normal centered position to a position indicative of the amount and direction of tilt of the support means and the amount and the position of the static unbalance in the workpiece.

References Cited by the Examiner
UNITED STATES PATENTS

| 2,754,678 | 7/56 | Stinger | 73—465 |
| 2,898,764 | 8/59 | Kinsey | 73—483 |

FOREIGN PATENTS

| 256,277 | 11/26 | Great Britain. |
| 655,151 | 7/51 | Great Britain. |

RICHARD C. QUEISSER, Primary Examiner.

ROBERT L. EVANS, JOSEPH P. STRIZAK,
Examiners.